United States Patent
Abusch-Magder et al.

(10) Patent No.: US 8,374,124 B2
(45) Date of Patent: Feb. 12, 2013

(54) METHOD AND APPARATUS FOR PROVIDING IP MOBILITY AND IP ROUTING IN AD HOC WIRELESS NETWORKS

(75) Inventors: David Abusch-Magder, Maplewood, NJ (US); Peter Bosch, New Providence, NJ (US); Milind M. Buddhikot, Manalapan, NJ (US); Thierry Etienne Klein, Fanwood, NJ (US); Paul Anthony Polakos, Marlboro, NJ (US); Harish Viswanathan, Morristown, NJ (US)

(73) Assignee: Alcatel Lucent, Paris (FR)

( * ) Notice: Subject to any disclaimer, the term of this patent is extended or adjusted under 35 U.S.C. 154(b) by 490 days.

(21) Appl. No.: 11/772,153

(22) Filed: Jun. 30, 2007

(65) Prior Publication Data
US 2008/0192677 A1 Aug. 14, 2008

Related U.S. Application Data

(60) Provisional application No. 60/900,833, filed on Feb. 12, 2007.

(51) Int. Cl.
- H04W 4/00 (2009.01)
- H04J 3/22 (2006.01)
- G06F 15/16 (2006.01)

(52) U.S. Cl. ........ 370/328; 370/469; 370/331; 370/338; 709/200; 709/227; 455/462

(58) Field of Classification Search .................. None
See application file for complete search history.

(56) References Cited

U.S. PATENT DOCUMENTS

| | | |
|---|---|---|
| 5,533,026 A | 7/1996 | Ahmadi et al. |
| 5,958,018 A | 9/1999 | Eng et al. |
| 2004/0103275 A1 * | 5/2004 | Ji et al. .................... 713/150 |
| 2004/0264503 A1 * | 12/2004 | Draves, Jr. ................ 370/469 |
| 2005/0136950 A1 * | 6/2005 | Masuda et al. ............ 455/462 |
| 2005/0154774 A1 * | 7/2005 | Giaffreda et al. .......... 709/200 |
| 2008/0205308 A1 * | 8/2008 | Prehofer et al. ........... 370/310 |

FOREIGN PATENT DOCUMENTS

| | | |
|---|---|---|
| EP | 1 530 381 A | 5/2005 |
| JP | 2003-333053 | 11/2003 |

OTHER PUBLICATIONS

International Search Report & Written Opinion corresponding PCT/US2008/001247, Jun. 3, 2008, Lucent Technologies Inc. "911-NOW: A Network on Wheels for Emergency Response and Disaster Recovery Operations," David Abusch-Magder et al, Bell Labs Technical Journal, Special Issue: Wireless Network Technology Issue Edited by Joseph A. Tarallo and James S. Peterson; published by Wiley InterScience; vol. 11, Issue 4, pp. 113-133, Mar. 9, 2007.
Jun. 23, 2011 Office Action in Korean Patent Application 10-2009-7016716, Alcatel-Lucent USA Inc., Applicant, 5 pages.
Nov. 30, 2011 Office Action in JP Patent Application No. 2009-549587, Alcatel-Lucent USA Inc., Applicant, 2 pages.

* cited by examiner

*Primary Examiner* — Jinsong Hu
*Assistant Examiner* — William Nealon
(74) *Attorney, Agent, or Firm* — Wall & Tong, LLP

(57) ABSTRACT

The invention includes methods and apparatuses for supporting mobility management and packet routing in ad hoc wireless networks. A method for mobility management includes detecting, at a first base station, a request by a wireless device to establish an association with the first base station where the first base station comprises a mobile base station, updating an association table of the first base station to include an association of the wireless device to the first base station, and propagating, toward a second base station, a message adapted to update an association table of the second base station, wherein the second base station is a mobile base station, wherein the message is propagated toward the second base station wirelessly. The packet routing functions of the present invention may be used independent of, or in conjunction with, the mobility management functions of the present invention.

17 Claims, 10 Drawing Sheets

600

700

METHOD AND APPARATUS FOR PROVIDING IP MOBILITY AND IP ROUTING IN AD HOC WIRELESS NETWORKS

CROSS-REFERENCE TO RELATED APPLICATIONS

This application claims the benefit of U.S. Provisional Application Ser. No. 60/900,833 entitled "911-NOW: A Network On Wheels For Emergency Response and Disaster Recovery Operations", filed Feb. 12, 2007, which is herein incorporated by reference in its entirety.

FIELD OF THE INVENTION

The invention relates to the field of communication networks and, more specifically, to wireless networks.

BACKGROUND OF THE INVENTION

Emergency response organizations increasingly depend on wireless communication technology to provide communication during emergencies. Disadvantageously, however, emergencies often result in damage to, or sometimes even destruction of, existing network infrastructure, thereby preventing communications between emergency personnel. In other words, the existing communications infrastructure lacks survivability. Furthermore, even if portions of the existing communications infrastructure do survive the emergency, the existing communications infrastructure may not be able to handle the increased traffic load typical during emergencies. Specifically, remaining portions of the existing communication infrastructure may be overloaded as emergency personnel, and the general public, attempt various types of communications. Such deficiencies became clear during the events of Sep. 11, 2001, and again during the events of Hurricane Katrina.

In a wireless network, mobile nodes (e.g., wireless user terminals) being served may move between wireless access points (e.g., from being served by one base station to being served by another base station). Mobile IP, an IP-layer mobility management protocol, is commonly used in wireless networks to keep track of movements of wireless user terminals between base stations. Disadvantageously, Mobile IP requires use of a dedicated Home Agent and Foreign Agent for providing mobility management. Furthermore, Mobile IPv4 suffers from inefficient triangular routing of packets, thereby resulting in additional transmissions in order to route packets through the network where such additional transmissions consume precious network resources and result in network congestion.

SUMMARY OF THE INVENTION

Various deficiencies in the prior art are addressed through the invention of a method and apparatus for mobility management and a method and apparatus for packet routing.

A method for mobility management includes detecting, at a first base station, a request by a wireless device to establish an association with the first base station where the first base station comprises a mobile base station, updating an association table of the first base station to include an association of the wireless device to the first base station, and propagating, toward a second base station, a message adapted to update an association table of the second base station, wherein the second base station is a mobile base station, wherein the message is propagated toward the second base station wirelessly.

A first method for packet routing includes receiving, from a first wireless device associated with a first base station, a user packet intended for a second wireless device associated with a second base station, encapsulating the received user packet within another packet to form an encapsulated user packet where the encapsulated user packet includes a header having a destination field identifying the second base station and a payload including the received user packet, and propagating the encapsulated user packet toward the second base station.

A second method for packet routing includes receiving a packet at a base station, where the received packet comprises a header identifying a destination base station and a payload including an embedded user packet and the embedded user packet includes a header identifying a destination wireless device for which the embedded user packet is intended, determining the destination base station from the header of the received packet, and processing the received packet according to the destination base station.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention is described within the context of a rapidly deployable wireless network (denoted herein as a 911 network on wheels, i.e., 911-NOW); however, the present invention is applicable to routing in various other wireless networks. A 911-NOW network is formed by placing a 911-NOW node(s) on a mobile platform(s) such that when the mobile platform(s) is dispatched to a network site, the 911-NOW node(s) provides a wireless communication network. As described herein, one or more 911-NOW nodes may be deployed to form a wireless network. The 911-NOW network may be a standalone wireless network that is independent of existing network infrastructure or an integrated wireless network that utilizes existing network infrastructure.

Figure 1:
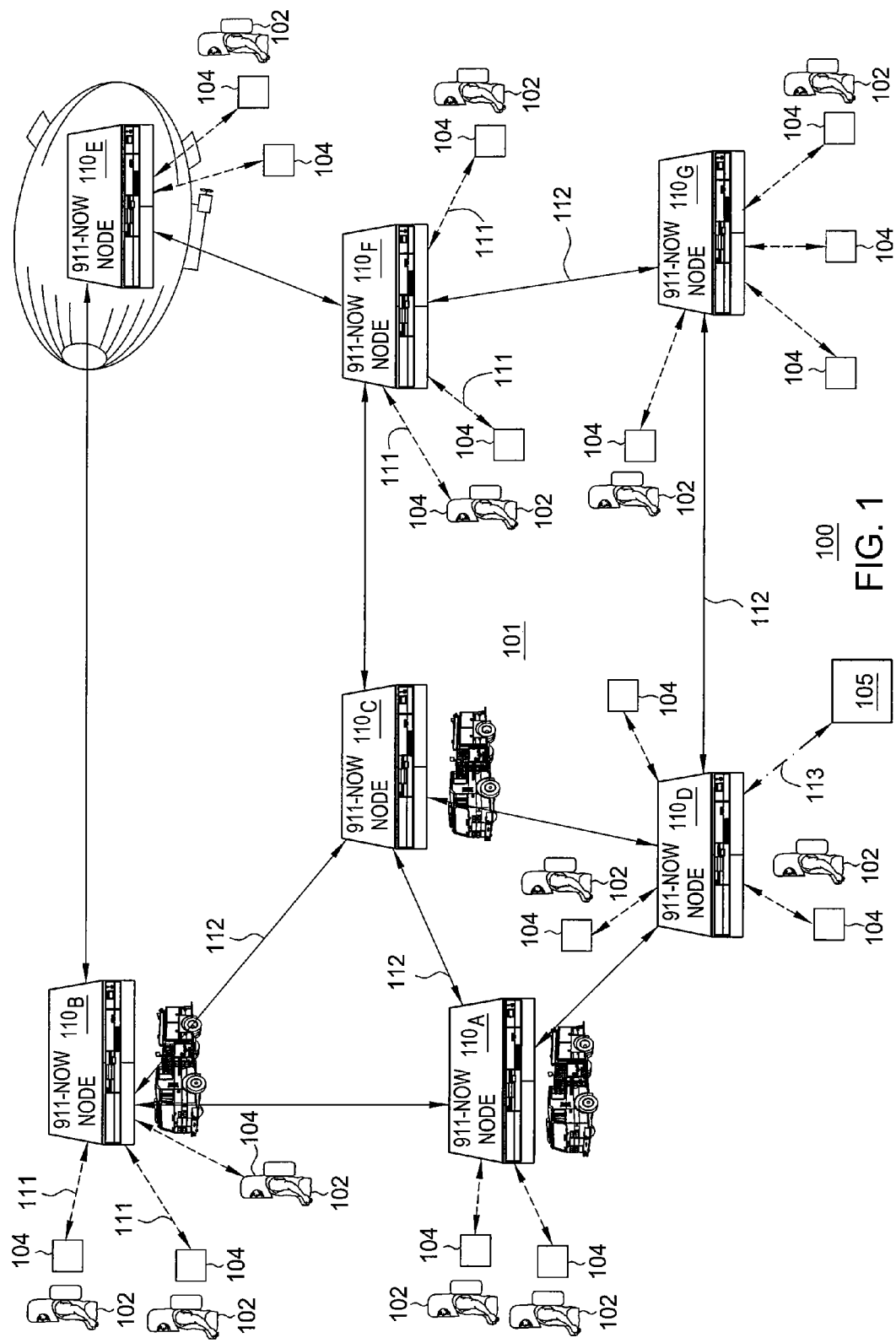
FIG. 1 depicts a standalone 911-NOW communication network architecture that is independent of any existing network infrastructure.

FIG. 1 depicts a standalone 911-NOW communication network architecture that is independent of any existing network infrastructure. Specifically, standalone 911-NOW communication network architecture 100 includes a plurality of 911-NOW nodes $110_A$-$110_G$ (collectively, 911-NOW nodes 110) supporting wireless communications at an emergency site 101. The standalone 911-NOW communication network architecture 100 provides a fully-functional network since each of the 911-NOW nodes 110 supports radio access network (RAN) functions, core networking functions, and services. As depicted in FIG. 1, each of the 911-NOW nodes 110 is placed or mounted on a mobile platform and transported to emergency site 101. The 911-NOW nodes 110 form a wireless network at emergency site 101.

The emergency site 101 may be any location or combination of locations at which a wireless network is required. The emergency site 101 may be a localized site, a collection of localized sites, a widespread site, a collection of widespread sites, and the like, as well as various combinations thereof. For example, emergency site 101 may be a single location, multiple locations within a town or city, or even span one or more counties, states, countries, or even continents. The 911-NOW network is not limited by the scope of the emergency site. The emergency site 101 may be associated with any type of emergency. For example, emergency site 101 may be associated with a natural disaster (e.g., a flood, a hurricane, a tornado, and the like), a manmade disaster (e.g., a chemical spill, a terrorist attack, and the like), and the like, as well as various combinations thereof.

As depicted in FIG. 1, emergency personnel (denoted herein as users 102 of the 911-NOW network 100) have responded to the emergency. The users 102 are performing various different functions at different areas of emergency site 101. For example, the users may be containing the disaster, participating in evacuation operations, participating in search and rescue operations, and the like, as well as various combinations thereof. The users 102 use equipment in responding to the emergency, including equipment capable of receiving and sending information wirelessly (denoted herein as wireless user devices 104 of users 102). The wireless user devices 104 include communication equipment, and may include various other types of emergency equipment (depending on the type of emergency, severity of the emergency, logistics of the emergency site, and various other factors).

For example, wireless user devices 104 may include wireless devices carried by emergency personnel for communicating with other emergency personnel, receiving information for use in responding at the emergency site, collecting information at the emergency site, monitoring conditions at the emergency site, and the like, as well as various combinations thereof. For example, wireless user devices 104 may include devices such as walkie-talkies, wireless headsets, cell phones, personal digital assistants (PDAs), laptops, and the like, as well as various combinations thereof. The wireless user devices 104 may include various other equipment, such as monitors (e.g., for monitoring breathing, pulse, and other characteristics; for monitoring temperature, precipitation, and other environmental characteristics; and the like), sensors (e.g., for detecting air-quality changes, presence of chemical or biological agents, radiation levels, and the like), and various other equipment.

As depicted in FIG. 1, a 911-NOW-based network is established at the emergency site 101 by deploying 911-NOW nodes 110 (illustratively, 911-NOW nodes $110_A$-$110_G$) to emergency site 101. The 911-NOW nodes 110 may be deployed using mobile platforms. The 911-NOW nodes 110 may be deployed using standalone mobile platforms. For example, 911-NOW nodes 110 may be placed in backpacks, suitcases, and like mobile cases which may be carried by individuals. The 911-NOW nodes 110 may be deployed using mobile vehicles, including land-based vehicles, sea-based vehicles, and/or air-based vehicles. For example, 911-NOW nodes may be placed (and/or mounted) on police cars, swat trucks, fire engines, ambulances, humvees, boats, helicopters, blimps, airplanes, unmanned drones, satellites, and the like, as well as various combinations thereof. The 911-NOW nodes 110 may be deployed using various other mobile platforms.

As depicted in FIG. 1, 911-NOW node $110_A$ is deployed using a fire engine, 911-NOW node $110_B$ is deployed using a fire engine, 911-NOW node $110_C$ is deployed using a fire engine, 911-NOW node $110_D$ is deployed as a standalone node, 911-NOW node $110_E$ is deployed using a blimp, 911-NOW node $110_F$ is deployed as a standalone node, and 911-NOW node $110_G$ is deployed using a fire engine. The inherent mobility of 911-NOW nodes 110 enables quick and flexible deployment of a wireless network as needed (e.g., when, where, and how the wireless network is needed), thereby providing scalable capacity and coverage on-demand as required by the emergency personnel. Since each 911-NOW node 110 supports RAN functions, core networking functions, and various service functions, deployment of even one 911-NOW node produces a fully-functional wireless network.

As depicted in FIG. 1, the 911-NOW nodes 110 support wireless communications for wireless user devices 104 (denoted herein as wireless access communications). The wireless access communications include wireless communications between a 911-NOW node 110 and wireless user devices served by that 911-NOW node 110. A 911-NOW node 110 includes one or more wireless access interfaces supporting wireless communications for wireless user devices 104 using respective wireless access connections 111 established between wireless user devices 104 and 911-NOW nodes 110. The 911-NOW nodes 110 further support mobility of user devices 104 at emergency site 101 such that, as users 102 move around emergency site 101, communication sessions between wireless user devices 104 of those users 102 and 911-NOW nodes 110 are seamlessly transferred between 911-NOW nodes 110.

As depicted in FIG. 1, the 911-NOW nodes 110 support wireless communications between 911-NOW nodes 110 (denoted herein as wireless mesh communications). The wireless mesh communications include wireless communications between 911-NOW nodes, including information transported between wireless user devices 104, control information exchanged between 911-NOW nodes 110, and the like, as well as various combinations thereof. A 911-NOW node 110 includes one or more wireless mesh interfaces supporting wireless communications with one or more other 911-NOW nodes 110. The wireless mesh communications between 911-NOW nodes 110 are supported using wireless mesh connections 112 established between 911-NOW nodes 110.

As depicted in FIG. 1, the following pairs of 911-NOW nodes 110 communicate using respective wireless mesh connections 112: 911-NOW nodes $110_A$ and $110_B$, 911-NOW nodes $110_A$ and $110_C$, 911-NOW nodes $110_A$ and $110_D$, 911-NOW nodes $110_B$ and $110_C$, 911-NOW nodes $110_C$ and $110_D$, 911-NOW nodes $110_B$ and $110_E$, 911-NOW nodes $110_C$ and $110_F$, 911-NOW nodes $110_D$ and $110_G$, 911-NOW nodes $110_E$ and $110_F$, and 911-NOW nodes $110_F$ and $110_G$. As such, 911-NOW nodes 110 of FIG. 1 communicate to form a wireless mesh network. Although a specific wireless mesh configuration is depicted and described with respect to FIG. 1, 911-NOW nodes 110 may communicate to form various other wireless mesh configurations, and mesh configurations may be modified in real-time as conditions change.

As depicted in FIG. 1, the 911-NOW nodes 110 support wireless communications for one or more management devices 105 (denoted herein as wireless management communications). The wireless management communications include wireless communications between a 911-NOW node 110 and a management device(s) 105 served by that 911-NOW node 110. A 911-NOW node 110 includes one or more wireless management interfaces supporting wireless communications for management device(s) 105. The wireless management communications between management device 105 and 911-NOW node $110_D$ are supported using a wireless management connection 113 established between management device 105 and 911-NOW node $110_D$.

The management device 105 is operable for configuring and controlling standalone 911-NOW network 100. For example, management device 105 may be used to configure and reconfigure one or more of the 911-NOW nodes 110, control access to the 911-NOW nodes, control functions and services supported by the 911-NOW nodes 110, upgrade 911-NOW nodes 110, perform element/network management functions for individual 911-NOW nodes or combinations of 911-NOW nodes (e.g., fault, performance, and like management functions) and the like, as well as various combinations thereof. The management device 105 may be implemented using existing devices (e.g., laptops, PDAs, and the like), or using a newly-designed device adapted to support such management functions. The management device 105 may connect to one or more 911-NOW nodes 110 directly and/or indirectly using wireline and/or wireless interfaces.

The 911-NOW nodes 110 support wireless communications using one or more wireless technologies. For wireless access communications, each 911-NOW node 110 may support one or more different wireless technologies, such as Global System for Mobile Communications (GSM), General Packet Radio Service (GPRS), Evolution-Data Optimized (1xEV-DO), Universal Mobile Telecommunications System (UMTS), High-Speed Downlink Packet Access (HSDPA), Worldwide Interoperability for Microwave Access (WiMAX), and the like. For wireless mesh communications, each 911-NOW node 110 may support Wireless Fidelity (WiFi) or WiMAX technology, microwave technologies, or any other wireless technology. For wireless management communications, each 911-NOW node 110 may support one or more such cellular technologies, and, further, may support WiFi technology, Bluetooth technology, or any other wireless technology.

The wireless communications supported by 911-NOW nodes 110 convey user information, control information, and the like, as well as various combinations thereof. For example, user information may include voice communications (e.g., voice calls, audio conferences, push-to-talk, and the like), data communications (e.g., text-based communications, high-speed data downloads/uploads, file transfers, and the like), video communications (e.g., video broadcasts, conferencing, and the like), multimedia communications, and the like, as well as various combinations thereof. The communications supported by 911-NOW nodes 110 may convey various combinations of content, e.g., audio, text, image, video, multimedia, and the like, as well as various combinations thereof. For example, control information may include network configuration information, network control information, management information and the like, as well as various combinations thereof. Thus, 911-NOW nodes 110 support wireless communication of any information.

Although a specific number of 911-NOW nodes 110 is depicted and described as being deployed to form a 911-NOW network, fewer or more 911-NOW nodes may be deployed to form a 911-NOW network supporting communications required to provide an effective emergency response. Similarly, although a specific configuration of 911-NOW nodes 110 is depicted and described as being deployed to form a 911-NOW network, 911-NOW nodes may be deployed in various other configurations (including different locations at one emergency site or across multiple emergency sites, different combinations of mesh connections between 911-NOW nodes, and the like, as well as various combinations thereof) to form a standalone 911-NOW network supporting RAN functions, CORE networking functions, and various services supporting multimedia communications to provide an effective emergency response.

As described herein, although one or more 911-NOW nodes 110 are capable of forming a fully-functional standalone mesh wireless network without relying on existing infrastructure (fixed or variable), where there is existing infrastructure (that was not damaged or destroyed), the standalone 911-NOW wireless network may leverage the existing network infrastructure to form an integrated 911-NOW wireless network capable of supporting various additional capabilities (e.g., supporting communications with one or more other standalone 911-NOW wireless networks, supporting communications with one or more remote emergency management headquarters, supporting communications with other resources, and the like, as well as various combinations thereof). An integrated 911-NOW wireless network including a mesh 911-NOW network in communication with existing network infrastructure is depicted and described herein with respect to FIG. 2.

Figure 2:
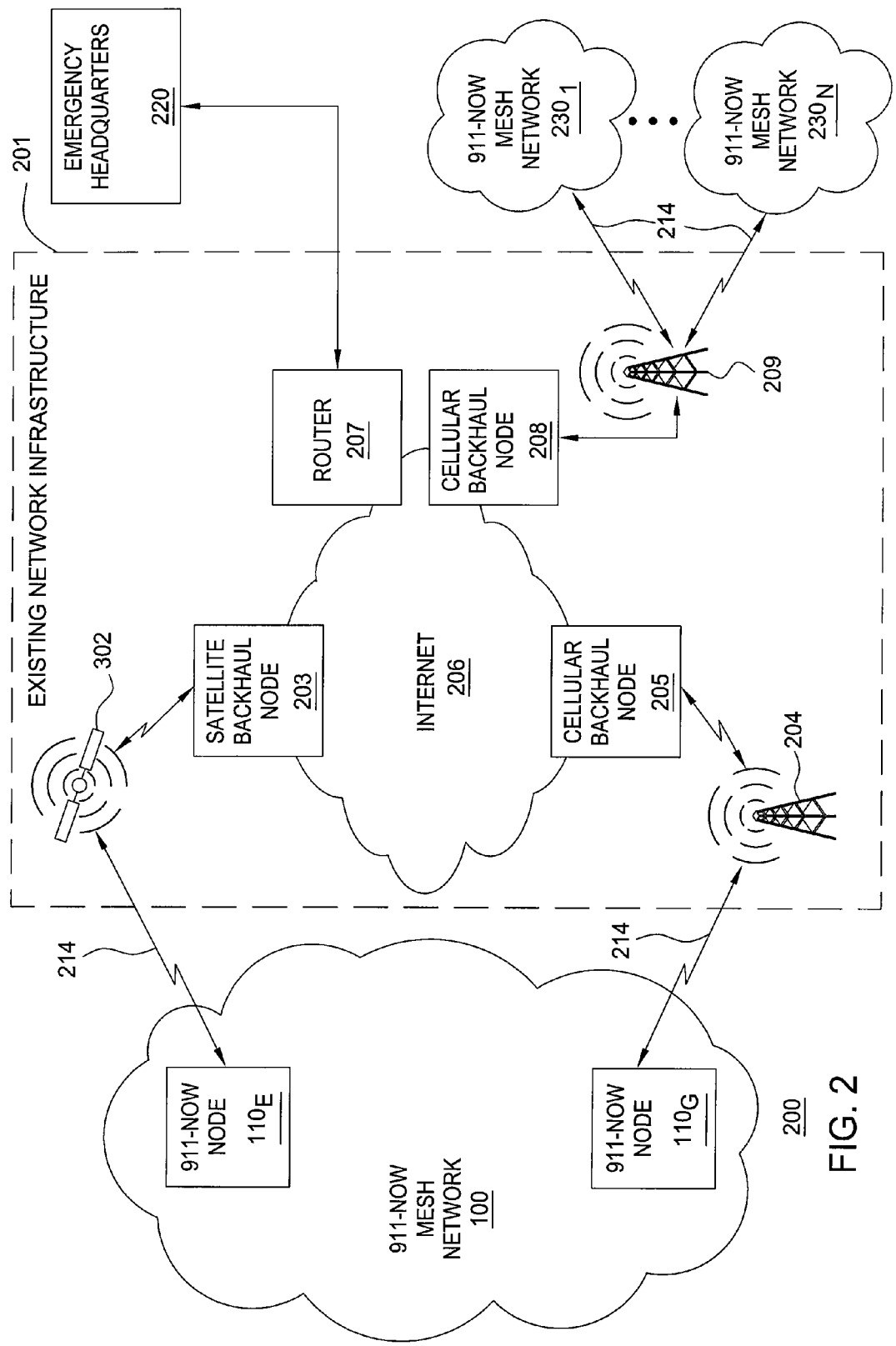
FIG. 2 depicts an integrated 911-NOW communication network architecture that utilizes a 911-NOW mesh network and an existing network infrastructure.

FIG. 2 depicts an integrated 911-NOW communication network architecture including a 911-NOW mesh network and an existing network infrastructure. Specifically, the integrated 911-NOW communication network architecture 200 includes 911-NOW mesh network 100 (depicted and described with respect to FIG. 1) and existing network infrastructure 201. The existing network infrastructure 201 may include any existing communications infrastructure adapted for supporting communications for 911-NOW mesh network 100 (e.g., including wireless communications capabilities, backhaul functions, networking functions, services, and the like, as well as various combinations thereof).

The existing network infrastructure 201 may include wireless access capabilities (e.g., radio access networks, satellite access networks, and the like, as well as various combinations thereof), backhaul capabilities (e.g., public and/or private, wireline and/or wireless, backhaul networks supporting mobility management functions, routing functions, and gateway functions, as well as various other related functions), core networking capabilities (e.g., AAA functions, DNS functions, DHCP functions, call/session control functions, and the like), services capabilities (e.g., application servers, media servers, and the like), and the like, as well as various combinations thereof. Since 911-NOW nodes 110 also supports such capabilities, in some embodiments at least a portion of these capabilities of existing network infrastructure 201 may only be relied upon when necessary.

As depicted in FIG. 2, the existing network infrastructure 201 supports wireless backhaul connections. Specifically, the existing network infrastructure 201 supports two wireless backhaul connections from 911-NOW mesh network 100.

The existing network infrastructure 201 supports a first wireless backhaul connection 214 with 911-NOW node $110_E$ using a satellite 202, where satellite 202 is in wireless backhaul communication with a satellite backhaul node 203 at the edge of Internet 206. The existing network infrastructure 201 supports a second wireless backhaul connection 214 with 911-NOW node $110_G$ using a cellular base station 204, where cellular base station in 204 is in wireline backhaul communication with a cellular backhaul node 205 at the edge of Internet 206.

As depicted in FIG. 2, the existing network infrastructure 201 further supports other connections to other locations with which users 102 of emergency site 101 may communicate. The existing network infrastructure 201 includes a router 207 supporting communications for an emergency headquarters 220 (which may include, for example, emergency personnel and/or emergency systems). The existing network infrastructure 201 includes a cellular backhaul node 208 and an associated base station 209 supporting communications for one or more other 911-NOW mesh networks $230_1$-$230_N$ (i.e., one or more other standalone 911-NOW networks established at remote emergency sites).

The existing network infrastructure 201 supports communications for 911-NOW mesh network 100. The existing network infrastructure 201 may support communications between wireless user devices 104 of 911-NOW mesh network 100 (e.g., complementing wireless mesh communications between 911-NOW nodes 110 of the standalone 911-NOW network 100). The existing network infrastructure 201 may support communications between wireless user devices 104 of 911-NOW mesh network 100 and other emergency personnel and/or emergency systems. For example, existing network infrastructure 201 may support communications between wireless user devices 104 of 911-NOW mesh network 100 and an emergency headquarters 220, one or more other 911-NOW mesh networks 230 (e.g., at emergency sites remote from emergency site 101), and the like, as well as various combinations thereof.

As depicted in FIG. 2, in addition to supporting one or more wireless access interfaces, one or more wireless mesh interfaces, and one or more wireless management interfaces, 911-NOW nodes 110 support one or more wireless backhaul interfaces supporting communications between 911-NOW nodes 110 and existing network infrastructure (illustratively, existing network infrastructure 201). The wireless backhaul communications between 911-NOW nodes 110 and existing network infrastructure 201 are supported using wireless backhaul connections 214 established between 911-NOW nodes 110 and existing network infrastructure 201. The wireless backhaul connections 214 may be provided using one or more wireless technologies, such as GSM, GPRS, EV-DO, UMTS, HSDPA, WiFi, WiMAX, microwave, satellite, and the like, as well as various combinations thereof.

The mesh networking capabilities provided by 911-NOW nodes 110, in combination with backhaul networking capabilities provided by 911-NOW nodes 110 using wireless backhaul connections with the existing network infrastructure 201, enable communications between emergency personnel at one emergency site (e.g., between users connected to 911-NOW nodes 110 of a standalone 911-NOW mesh network), between emergency personnel at different emergency sites (e.g., between users connected to 911-NOW nodes 110 of different standalone wireless mesh networks), between emergency personnel at one or more emergency sites and emergency management personnel (e.g., users stationed at emergency headquarters 220), and the like, as well as various combinations thereof.

Thus, 911-NOW nodes 110 may each support four different types of wireless interfaces. The 911-NOW nodes 110 support one or more wireless access interfaces by which user devices 104 may access 911-NOW nodes 110. The 911-NOW nodes 110 support one or more wireless mesh interfaces by which 911-NOW nodes 110 communicate with other 911-NOW nodes 110. The 911-NOW nodes 110 support one or more wireless backhaul interfaces by which the 911-NOW nodes 110 communicate with existing network infrastructure. The 911-NOW nodes 110 support one or more wireless management interfaces by which network administrators may manage the 911-NOW-based wireless network. The functions of a 911-NOW node 110 may be better understood with respect to FIG. 3.

Figure 3:
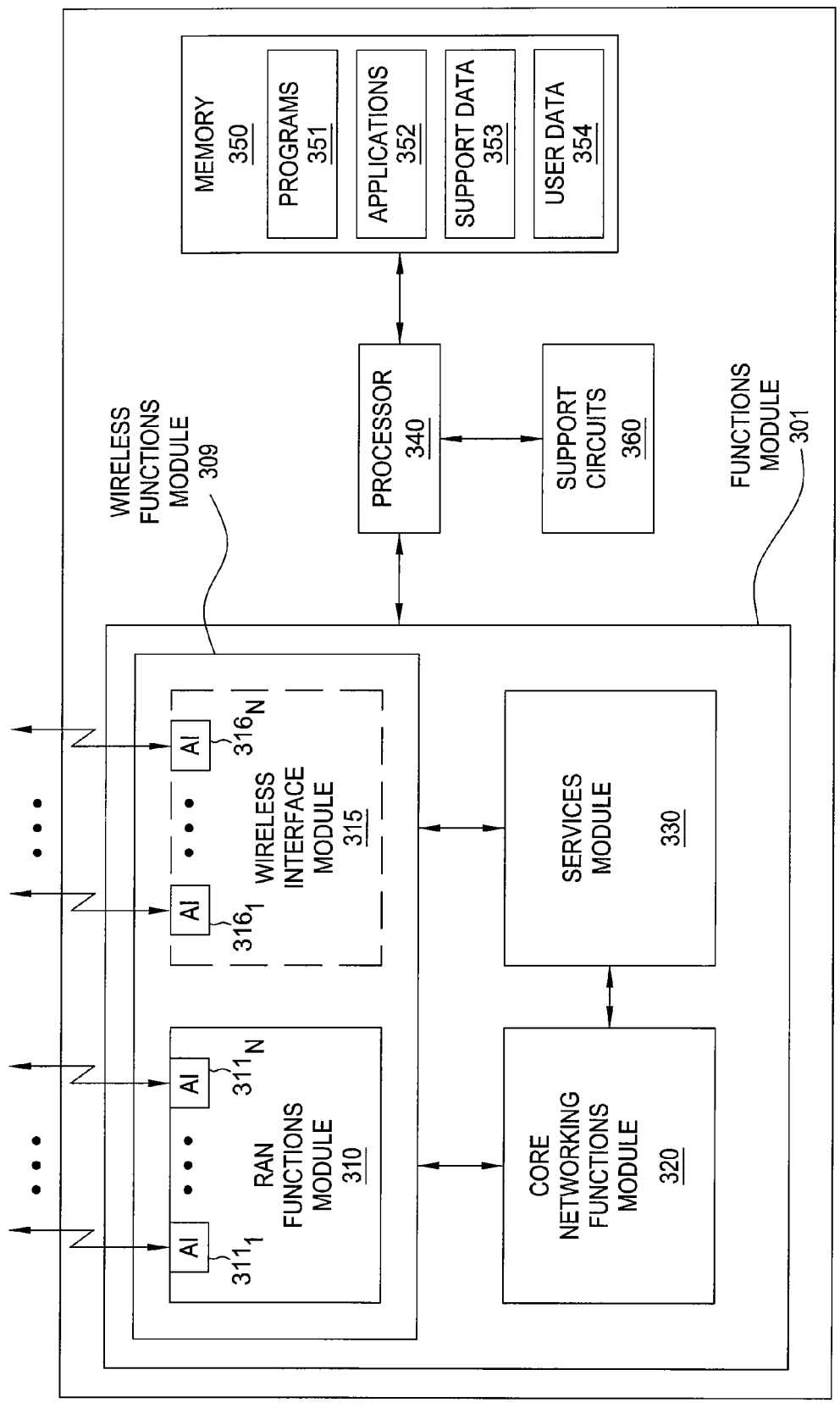
FIG. 3 depicts a high-level block diagram of one embodiment of a 911-NOW node.

FIG. 3 depicts a high-level block diagram of one embodiment of a 911-NOW node. Specifically, as depicted in FIG. 3, 911-NOW node 110 includes a functions module 301, a processor 340, a memory 350, and support circuit(s) 360 (as well as various other processors, modules, storage devices, support circuits, and the like required to support various functions of 911-NOW node 110). The functions module 301 cooperates with processor 340, memory 350, and support circuits 360 to provide various functions of 911-NOW node 110, as depicted and described herein).

The processor 340 controls the operation of 911-NOW node 110, including communications between functions module 301, memory 350, and support circuit(s) 360. The memory 350 includes programs 351, applications 352, support data 353 (e.g., user profiles, quality-of-service profiles, and the like, as well as various combinations thereof), and user data 354 (e.g., any information intended for communication to/from user devices associated with 911-NOW node 110). The memory 350 may store other types of information. The support circuit(s) 360 may include any circuits or modules adapted for supporting functions of 911-NOW node 110, such as power supplies, power amplifiers, transceivers, encoders, decoders, and the like, as well as various combinations thereof.

The functions module 301 includes a wireless functions module 309, a core (CORE) networking functions module 320, and a services module 330. The wireless functions module 309 includes a radio access network (RAN) functions module 310 and, optionally, a wireless interface module 315. The CORE networking functions module 320 provides CORE networking functions. The services module 330 provides one or more services. The RAN functions module 310 (and, when present, wireless interface module 315) communicate with both CORE networking functions module 320 and services module 330, and CORE networking functions module 320 and services module 330 communicate, to provide functions depicted and described herein.

The wireless functions module 309, CORE networking functions module 320, and services module 330 cooperate (in combination with processor 340, memory 350, and support circuits 360, and any other required modules, controllers, and the like, which are omitted for purposes of clarity) to provide a rapidly deployable wireless node which may form: (1) a single-node, standalone wireless network; (2) a multi-node, standalone wireless network (i.e., using wireless mesh connections between 911-NOW nodes); or (3) an integrated wireless network (i.e., using wireless backhaul connections between one or more 911-NOW nodes and existing network infrastructure and, optionally, using wireless mesh connections between 911-NOW nodes).

The RAN functions module 310 provides RAN functions. The RAN functions include supporting one or more wireless access interfaces for communications associated with wireless user devices. Specifically, RAN functions module 310 supports a plurality of air interfaces (AIs) $311_1$-$311_N$ (collectively, AIs 311). The AIs 311 provide wireless access interfaces supporting communications associated with wireless user devices. For example, AIs 311 may support functions typically provided by a base transceiver station (BTS).

The RAN functions module 310 provides control functions. The control functions may include any control functions typically performed by controllers in radio access networks. For example, the control functions may include functions such as admission control, power control, packet scheduling, load control, handover control, security functions, and the like, as well as various combinations thereof. For example, in one embodiment, the control functions may include functions typically performed by RAN network controllers (RNCs) or similar wireless network controllers.

The RAN functions module 310 provides network gateway functions. The network gateway functions may include any functions typically performed in order to bridge RAN and CORE networks, such as IP session management functions, mobility management functions, packet routing functions, and the like, as well as various combinations thereof. For example, where intended for use with CDMA2000-based wireless technology, the network gateway functions may include functions typically performed by a Packet Data Serving Node (PDSN). For example, where intended for use with GPRS-based and/or UMTS-based wireless technology, the network gateway functions may include functions typically performed by a combination of a GPRS Gateway Support Node (GGSN) and a Serving GPRS Support Node (SGSN).

In one embodiment, RAN functions module 310 may be implemented as a base station router (BSR). In one such embodiment, the BSR includes a base station (BS) or one or more modules providing BS functions, a radio network controller (RNC) or one or more modules providing RNC functions, and a network gateway (NG) or one or more modules providing NG functions. In such embodiments, RAN functions module 310 supports any functions typically supported by a base station router.

The wireless interface module 315 provides one or more wireless interfaces. The wireless interfaces provided by wireless interface module may include one or more of: (1) one or more wireless mesh interfaces supporting communications with other 911-NOW nodes; (2) one or more wireless backhaul interfaces supporting communications with existing network infrastructure; and/or (3) one or more wireless management interfaces supporting communications with one or more management devices. The wireless interface module 315 supports a plurality of air interfaces (AIs) $316_1$-$316_N$ (collectively, AIs 316), which provide wireless interfaces supporting communications associated with one or more of: one or more other 911-NOW nodes, existing network infrastructure, and one or more management devices.

In one embodiment, a 911-NOW node 110 is implemented without wireless interface module 315 (e.g., if the 911-NOW node 110 is not expected to require wireless mesh, backhaul, or management capabilities). In one embodiment, a 911-NOW node 110 includes a wireless interface module 315 supporting a subset of: one or more wireless mesh interfaces, one or more wireless backhaul interfaces, and one or more wireless management interfaces (i.e., the 911-NOW node is tailored depending on whether the 911-NOW node 110 will require wireless management, mesh, and/or backhaul capabilities). In one embodiment, a 911-NOW node 110 includes a wireless interface module 315 supporting each of: one or more wireless mesh interfaces, one or more wireless backhaul interfaces, and one or more wireless management interfaces (i.e., all types of wireless interfaces are available should the 911-NOW node 110 require such wireless capabilities).

The CORE networking functions module 320 provides networking functions typically available from the CORE network. For example, CORE networking functions module 320 may provide authentication, authorization, and accounting (AAA) functions, domain name system (DNS) functions, dynamic host configuration protocol (DHCP) functions, call/session control functions, and the like, as well as various combinations thereof. One skilled in the art knows which functions are typically available from the CORE network.

The services module 330 provides services. The services may include any services capable of being provided to wireless user devices. In one embodiment, for example, services module 330 may provide services typically provided by application servers, media servers, and the like, as well as various combinations thereof. For example, services may include one or more of voice services, voice conferencing services, data transfer services (e.g., high-speed data downloads/uploads, file transfers, sensor data transfers, and the like), video services, video conferencing services, multimedia services, multimedia conferencing services, push-to-talk services, instant messaging services, and the like, as well as various combinations thereof. One skilled in the art knows which services are typically available over RAN and CORE networks.

Although primarily depicted and described herein with respect to a specific configuration of a 911-NOW node including three modules providing wireless functions (including RAN functions and, optionally, additional wireless interfaces and associated interface functions), CORE networking functions, and services, respectively, 911-NOW nodes may be implemented using other configurations for providing wireless functions, CORE networking functions, and services. Similarly, although primarily depicted and described herein with respect to a specific configuration of a functions module providing specific wireless functions, CORE networking functions, and services, functions modules of 911-NOW nodes may be implemented using other configurations for providing wireless functions, CORE networking functions, and services.

Therefore, it is contemplated that at least a portion of the described functions may be distributed across the various functional modules in a different manner, may be provided using fewer functional modules, or may be provided using more functional modules. Furthermore, although primarily depicted and described with respect to specific wireless functions (including RAN functions and, optionally, one or more additional wireless interface functions), CORE networking functions, and services, it is contemplated that fewer or more wireless functions (including RAN functions, optionally, and one or more additional wireless interface functions), CORE networking functions, and/or services may be supported by a 911-NOW node. Thus, 911-NOW nodes are not intended to be limited by the example functional architectures depicted and described herein with respect to FIG. 3.

In emergency situations, users (emergency personnel) often move around an emergency site, which may include multiple network access points (i.e. 911-NOW nodes). As a user moves around an emergency site, a user device carried by the user may switch from being served by a first 911-NOW node to being served by a second 911-NOW node. In order for the user device to receive communications, the 911-NOW network must know that communications intended for delivery to that user device must be routed to the second 911-NOW node with which the user device is associated. Thus, associations between user devices and 911-NOW nodes must be available (e.g., maintained proactively, or capable of discovery as needed) to 911-NOW nodes for supporting delivery of information to user devices. An example of a user moving such that the associated user device switches from being associated with a first 911-NOW module to being associated with a second 911-NOW module is depicted and described with respect to FIG. 4.

Figure 4:
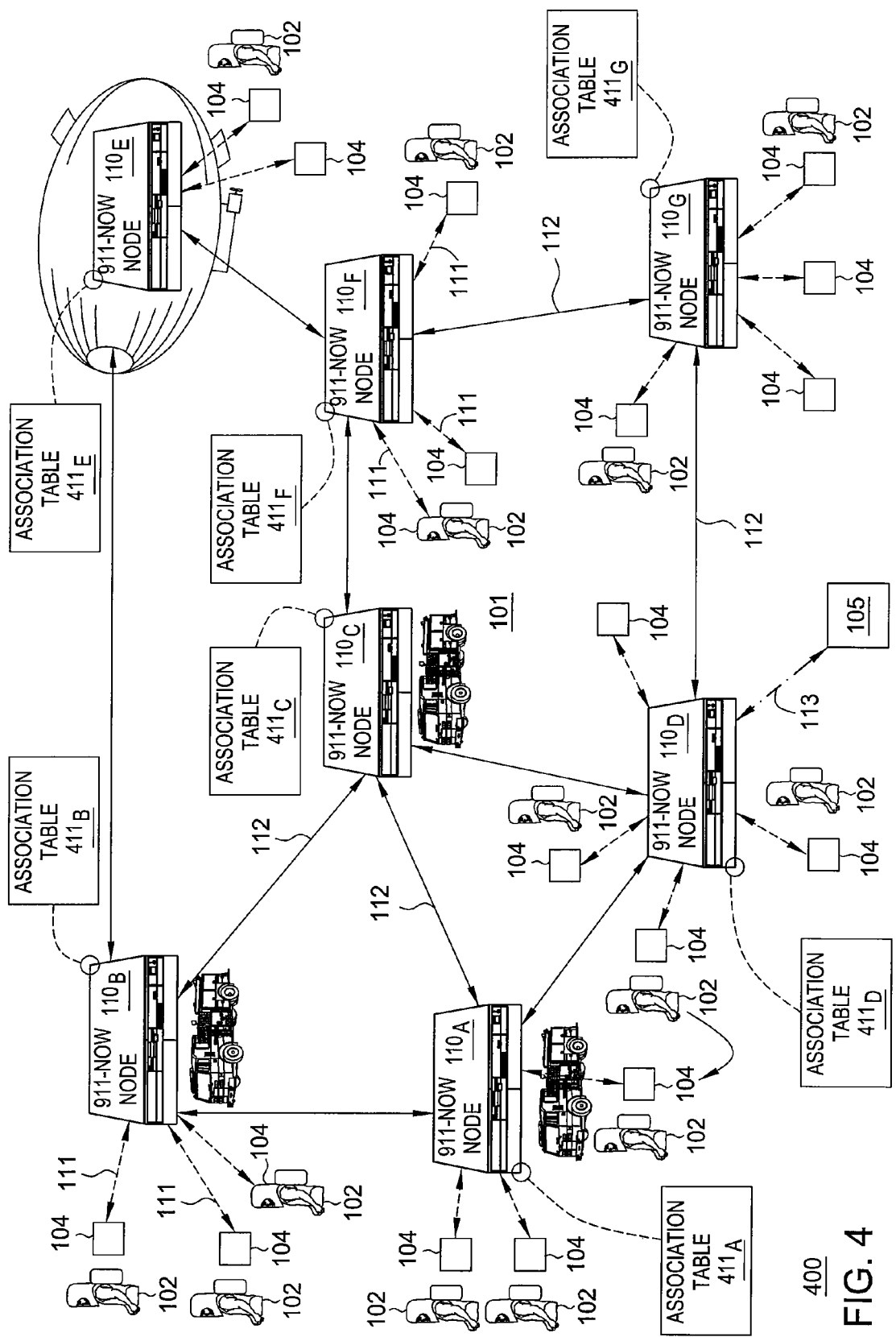
FIG. 4 depicts the 911-NOW communication network architecture of FIG. 1 showing a manner in which associations between user devices and 911-NOW nodes are maintained.

FIG. 4 depicts the 911-NOW communication network architecture of FIG. 1 showing a manner in which associations between user devices and 911-NOW nodes may be made available to 911-NOW nodes. Although primarily depicted and described within the context of a standalone wireless network (illustratively, standalone wireless network 100 of FIG. 1), the present invention may also be used in an integrated wireless network (e.g., such as the integrated wireless network of FIG. 2), or any other wireless network. As depicted in FIG. 4, each of the 911-NOW nodes $110_A$-$110_G$ maintains an association table $411_A$-$411_G$ (collectively, association tables 411), respectively.

The present invention enables associations between user devices and 911-NOW nodes 110 to be made available to 911-NOW nodes 110 using the association tables 411. In one embodiment, an association between a user device 104 and a 911-NOW node 110 may be made available to a 911-NOW node 110 directly (i.e., where the association table 411 maintained at that 911-NOW node 110 includes a record of the association between the user device 104 and the 911-NOW node 110 currently serving user device 104). In one embodiment, an association between a user device 104 and a 911-NOW node 110 may be made available to a 911-NOW node 110 indirectly (e.g., the 911-NOW node may discover the association, as needed, using a discovery process, such as using route request messages).

In one embodiment, referred to herein as the proactive association update process, association tables 411 each maintain associations for all user devices 104 at emergency site 101. Specifically, for each user device 104, each association table 411 maintains an association between that user device 104 and the 911-NOW node 110 with which the user device 104 is currently associated. In this embodiment, in order to proactively maintain association tables 411, each time a user device 104 switches from being served by one 911-NODE 110 to being served by another 911-NOW node 110, all association tables 411 of all respective 911-NOW nodes 110 must be updated accordingly.

In one embodiment, referred to herein as the passive association update process, each association table 411 maintains associations for user devices 104 currently associated with that 911-NOW node 110, but does not proactively maintain associations for all user devices 104. In one further embodiment, an association table 411 maintained at a 911-NOW node 110 may also maintain associations for one or more other user device 404 not currently associated with that 911-NOW node. For example, an association table 411 maintained at a 911-NOW node 110 may also include associations between user devices and other 911-NOW nodes, which that 911-NOW node 110 may discover (e.g., via association table update messages and/or route update messages).

Figure 5:
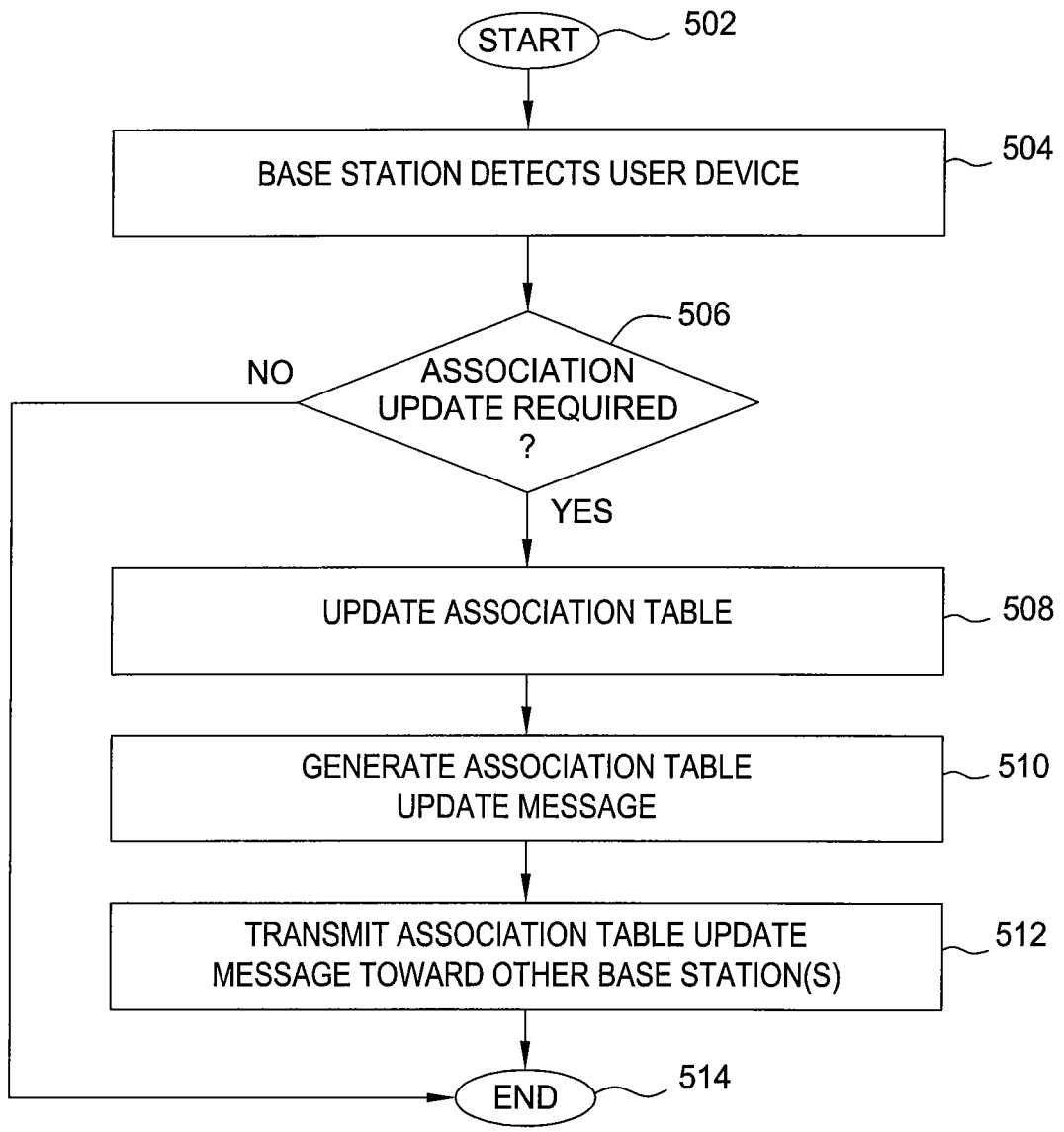
FIG. 5 depicts a method according to one embodiment of the present invention.

FIG. 5 depicts a method according to one embodiment of the present invention. Specifically, method 500 of FIG. 5 includes a method for maintaining associations between user devices and base stations in a wireless network. Although primarily depicted and described with respect to base stations of 911-NOW nodes, method 500 of FIG. 5 may be used for maintaining associations between user devices and other wireless access points. Although depicted and described as being performed serially, at least a portion of the steps of method 500 of FIG. 5 may be performed contemporaneously, or in a different order than depicted and described with respect to FIG. 5. The method 500 begins at step 502 and proceeds to step 504.

At step 504, a user device is detected at a base station. The user device may be a user device previously associated with that base station, a user device not previously associated with any base station (e.g., the user has just arrived at the emergency site), or a user device previously associated with a different base station (e.g., the user has moved at the emergency site). At step 506, a determination is made as to whether an association update is required (i.e., an update of association tables in the network to identify the base station that is serving the detected user device). If an association update is not required, method 500 proceeds to step 514, where method 500 ends. If an association update is required, method 500 proceeds to step 508.

In one embodiment, the determination as to whether an association update is required is performed by searching an association table (maintained locally at the base station which detected the user device) for an entry for the detected user device. If an entry is not identified, an association for the detected user device must be created and disseminated to other base stations. If an entry for the user device is identified and the entry includes the base station that detected the user device, no association update is required. If an entry for the user device is identified and the entry identifies a base station other than the base station that detected the user device, an association update is required.

At step 508, the association table is updated. If an entry for the detected user device does not exist in the association table, an entry for the detected user device is added to the association table. The added entry may include one or more identifiers of the user device and one or more identifiers of the base station with which the user device is associated (i.e., the base station that detected the user device). If an entry for the detected user device does exist in the association table, the entry for the detected user device is updated (from being associated with some other base station to being associated with the base station which detected the user device).

At step 510, the base station generates an association table update message, which includes information enabling the same update to be made in association tables maintained at other base stations in the network (e.g., a mapping of one or more identifiers of the user device to one or more identifiers of the base station with which the user device is now associated). Although described as generating one association table update message, the base station may generate multiple association table update messages (e.g., individually, or using a copy function to create copies of the association table update message). The association table update message may be generated in any format using any protocol.

At step 512, the base station propagates the association table update message(s) toward one or more other base stations of the network. The propagation of the association table update message(s) is dependent on the type of association update processing being implemented (e.g., a proactive association update process, a passive association update process, or some other association update process).

In one embodiment, in which the proactive association update process is implemented, the base station propagates the association table update message(s) in a manner for notifying each of the other base stations in the network about the association update. In one embodiment, the base station transmits individual association table update messages toward every other base station in the network. In another embodiment, the base station transmits association table update messages toward its neighbor base stations, which in turn update respective association tables and forward the association table update messages toward their neighbor base stations, and so on, such that association table update messages are flooded to every other base station in the network. In this embodiment, association table update messages may be distributed using various other message distribution schemes.

As an example, referring back to FIG. 4, a user 402 moves within emergency site 101 such that a user device 404 carried by user 402 switches from being associated with 911-NOW node 110$_D$ to being associated with 911-NOW node 110$_A$. In an embodiment using a proactive association update process, in order to enable 911-NOW network 400 to deliver communications to user device 404, the association tables 411 of each of the 911-NOW nodes 110 in the network are updated to reflect the change of user device 404 from being associated with 911-NOW node 110$_D$ to being associated with 911-NOW node 110$_A$.

In this example, upon detecting user device 404, 911-NOW node 110$_A$ updates local association table 411$_A$ to reflect the change of user device 404 from being associated with 911-NOW node 110$_D$ to being associated with 911-NOW node 110$_A$. The 911-NOW node 110$_A$ then initiates communication adapted to notify other 911-NOW nodes 110 of the changed association. The 911-NOW node 110$_A$ generates one or more association table update messages describing the change of user device 404 from being associated with 911-NOW node 110$_D$ to being associated with 911-NOW node 110$_A$. The association table update message(s) is distributed to each of the other 911-NOW nodes 110 of 911-NOW network 400. The association table update message(s) may be distributed in any manner.

For example, in one embodiment, 911-NOW node 110$_A$ transmits a separate association table update message to every other 911-NOW node 110 in 911-NOW network 100. In this embodiment, for example, 911-NOW node 110$_A$ transmits the association table update message to 911-NOW nodes 110$_B$, 110$_C$, 110$_D$, 110$_E$, 110$_F$, and 110$_G$. Upon receiving the association table update message, 911-NOW nodes 110$_B$, 110$_C$, 110$_D$, 110$_E$, 110$_F$, and 110$_G$ update association tables 411$_B$, 411$_C$, 411$_D$, 411$_E$, 411$_F$, and 411$_G$, respectively.

For example, in another embodiment, 911-NOW node 110$_A$ initiates association table update message flooding, whereby 911-NOW node 110$_B$ transmits the association table update message to neighboring ones of 911-NOW nodes 110, which forward the association table update message to their neighbors, and so on, until all 911-NOW nodes 110 have been updated. In this embodiment, for example, 911-NOW node 110$_A$ transmits the association table update message to 911-NOW nodes 110$_B$, 110$_C$, and 110$_D$. Upon receiving the association table update message, the neighboring 911-NOW nodes 110$_B$, 110$_C$, and 110$_D$ update respective association tables 411$_B$, 411$_C$, and 411$_D$, and then forward the association table update message to neighboring ones of 911-NOW nodes 110, and so on.

In one embodiment, in which the passive association update process is implemented, the base station propagates one association table update message toward one other base station in the network; namely, toward the base station with which the user device was previously associated (which is also referred to herein as the base station for which the association table update message is intended). The association table update message may traverse zero or more base stations in the (i.e., the source of the association table update message) path from the base station with which the user device is currently associated and the base station with which the base station was previously associated (i.e., the destination of the association table update message).

In one embodiment of the passive association update process, only the destination base station for which the association table update message is intended (i.e., the base station with which the user device is now associated) is updated in response to receiving the association table update message. In this embodiment, no other base stations along the path between the base station from which the association table update message was initiated and the base station for which the association table update message is intended is updated. In this embodiment, each time a base station receives information intended for delivery to a user device, if the user device is not served by that base station the base station must initiate a route request message in order to discover the base station that is currently serving the user device.

As an example, referring back to FIG. 4, user 402 moves within emergency site 101 such that a user device 404 carried by user 402 switches from being associated with 911-NOW node 110$_D$ to being associated with 911-NOW node 110$_A$. In this embodiment of the passive association update process, where an association table update message is transmitted from 911-NOW node 110$_D$ to 911-NOW node 110$_A$ via 911-NOW node 110$_C$, 911-NOW node 110$_C$ merely forwards the association table update message to 911-NOW node 110$_A$, which updates association table 411$_A$ to reflect the new association. The 911-NOW node 110$_C$ does not update association table 411$_C$ to reflect the new association.

In another embodiment of the passive association update process, the destination base station for which the association table update message is intended, as well as any other base station along the path between the base station from which the association table update message was initiated and the base station for which the association table update message is intended, is updated in response to receiving the association table update message. In this embodiment, each time a base station receives information intended for delivery to a user device, if the user device is not served by that base station (or the base station has not discovered the current association of the user device, e.g., by receiving an association table update message exchanged between two base stations) the base station must initiate a route request message in order to discover the base station that is currently serving the user device.

As an example, referring back to FIG. 4, as described above, user 402 moves within emergency site 101 such that a user device 404 carried by user 402 switches from being associated with 911-NOW node 110$_D$ to being associated with 911-NOW node 110$_A$. In this embodiment of the passive association update process, where an association table update message is transmitted from 911-NOW node 110$_D$ to 911-NOW node 110$_A$ via 911-NOW node 110$_C$, 911-NOW node 110$_C$ receives the association table update message, updates association table 411$_C$, and forwards the association table update message to 911-NOW node 110$_A$, which updates association table 411$_A$ to reflect the new association.

At step 514, method 500 ends. Although depicted and described as ending (for purposes of clarity), method 500 of FIG. 5 may continue to be performed each time an association between a user device and a base station changes. Using method 500 of FIG. 5, each base station in the network has a means of determining a current association between a user device and the base station currently serving that user device (e.g., either directly using an association table lookup or indirectly via route update messages). This enables each base station in the network to effectively forward packets intended for a user device toward the base station currently serving that user device, thereby ensuring that packets intended for a user device are always able to be delivered to that user device. A method for processing an association table update message is depicted and described herein with respect to FIG. 6.

Figure 6:
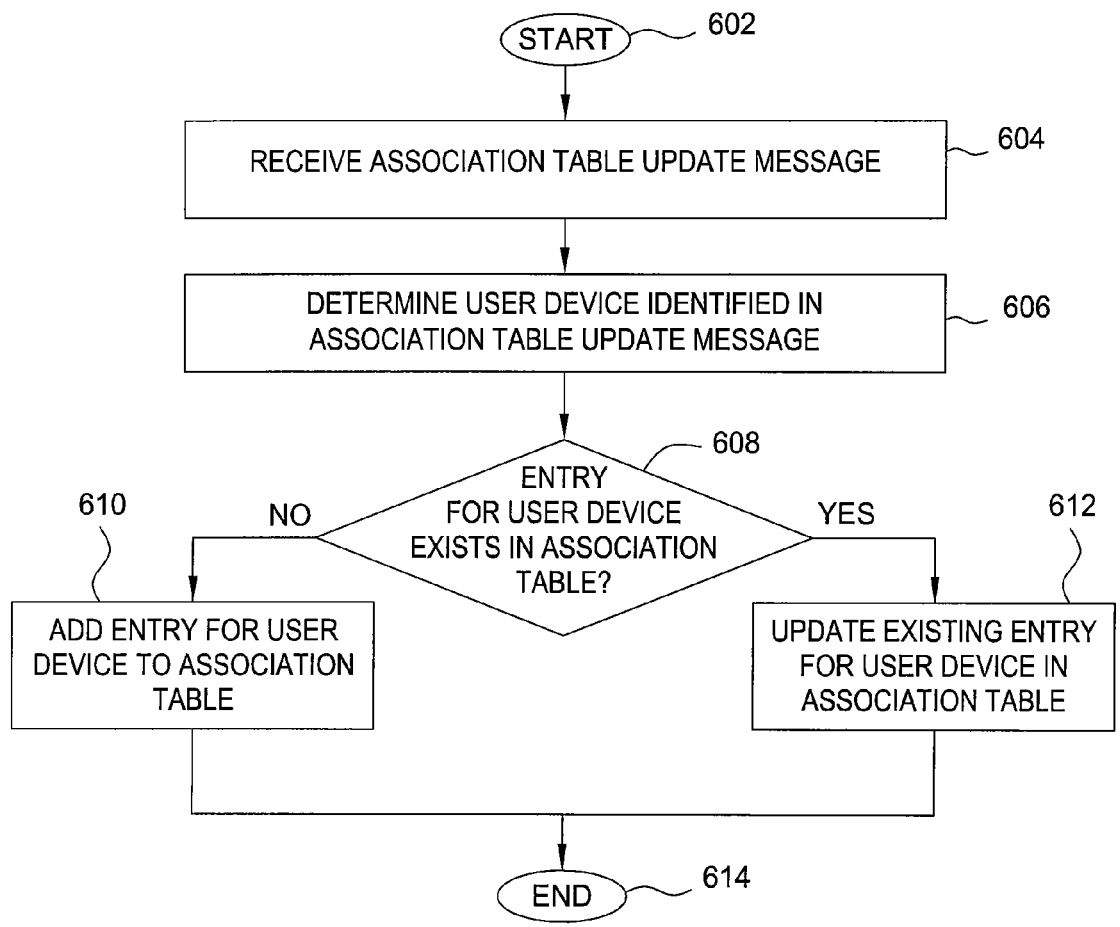
FIG. 6 depicts a method according to one embodiment of the present invention.

FIG. 6 depicts a method according to one embodiment of the present invention. Specifically, method 600 of FIG. 6 includes a method for updating an association table in response an association table update message. Although primarily depicted and described with respect to base stations of 911-NOW nodes, method 600 of FIG. 6 may be used for maintaining associations between user devices and other wireless access points. Although depicted and described as being performed serially, at least a portion of the steps of method 600 of FIG. 6 may be performed contemporaneously, or in a different order than depicted and described with respect to FIG. 6. The method 600 begins at step 602 and proceeds to step 604.

At step 604, a base station receives an association table update message. The base station receives the association table update message from another base station (e.g., according to method 400 depicted and described with respect to FIG. 4). At step 606, the base station determines the user device identified in the association table update message (by reading the received message). At step 608, the base station determines whether an entry for the identified user device exists in the association table. For example, the base station may search the association table using an identifier of the user device.

If an entry for the identified user device exists in the association table, method 600 proceeds to step 610, at which point the base station adds an entry for the user device to the association table. If an entry for the identified user device does not exist in the association table, method 600 proceeds to step 612, at which point the base station updates the existing entry for the user device in the association table. In either case, the association table of the base station is updated to include the current association between the user device and the base station currently serving that user device. From steps 610 and 612, method 600 proceeds to step 614, where method 600 ends.

While using association tables as depicted and described herein with respect to FIG. 5-FIG. 6 provides numerous advantages in wireless mobility and wireless routing, routing of packets along multi-hop backhaul paths (i.e., paths traversing at least one intermediate base station between the base station serving the transmitting user device and the base station serving the receiving user device) in a network using association tables requires each base station along the backhaul path to reference its association table in order to route the packets along the backhaul path. In one embodiment, an IP-in-IP tunnel may be established between base stations which form the endpoints of the backhaul path in order to prevent intermediate base stations along the multi-hop backhaul path from having to reference respective association tables. An IP-in-IP tunnel is depicted and described with respect to FIG. 7.

Figure 7:
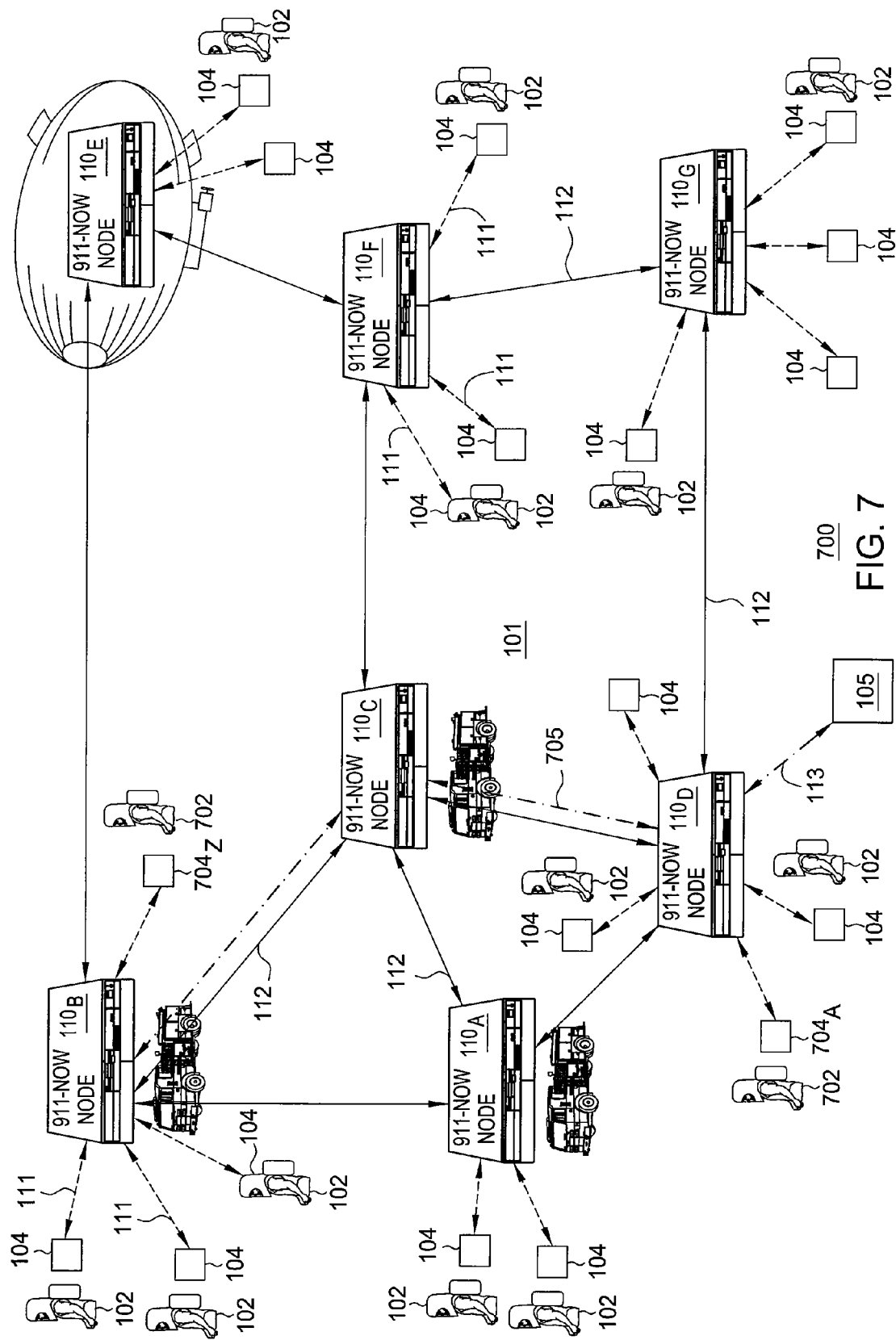
FIG. 7 depicts the 911-NOW communication network architecture of FIG. 1 in which an IP-in-IP tunnel is established between 911-NOW nodes.

FIG. 7 depicts the 911-NOW communication network architecture of FIG. 1 in which an IP-in-IP tunnel is established between 911-NOW nodes. An IP-in-IP tunnel is formed for transporting information from a source user device to a destination user device using a backhaul path between 911-NOW nodes 110 (which may be formed using wireline and/or wireless connections between pairs of base stations along the backhaul path). An IP-in-IP tunnel is formed between a source 911-NOW node 110 (i.e., the 911-NOW node serving the user device that is the source of information being transmitted) and a destination 911-NOW node 110 (i.e., the 911-NOW node serving the user device that is the destination of information being transmitted).

An IP-in-IP tunnel is formed by encapsulating each IP packet received from a user device over a wireless access interface within another IP packet for transmission over a mesh/backhaul interface. The IP packet received from a user device (e.g., over a wireless access interface) is denoted as an inner IP packet. The inner IP packet includes a header, which includes (among other information) a source address field and a destination address field identifying the source user device and destination user device of the IP packet, respectively. The IP packet transmitted toward the destination 911-NOW node (e.g., over a wired or wireless backhaul interface) is denoted as an outer IP packet. The outer IP packet includes (among other information) a source address field and a destination address field, which identify the source and destination 911-NOW nodes for the IP packet, respectively.

An example of an IP-in-IP tunnel is depicted in FIG. 7. As depicted in FIG. 7, a source user device $704_A$ (associated with 911-NOW node $110_D$) transmits information to a destination user device $704_Z$ (associated with 911-NOW node $110_B$) using an IP-in-IP tunnel 705 that is established along the backhaul path from source 911-NOW node $110_D$ to destination 911-NOW node $110_E$ (via intermediate 911-NOW node $110_C$). By using IP-in-IP tunnel 705, standard routing algorithms may be used for routing the IP-in-IP packets along the backhaul path, thereby preventing each intermediate 911-NOW node (illustratively, intermediate 911-NOW node $110_C$) from having to perform association table lookups in order to forward packets.

A description of IP-in-IP tunnel 705 follows. The source user device $704_A$ transmits IP packets to source 911-NOW node $110_D$. The source 911-NOW node $110_D$, upon determining that the received IP packets are intended for delivery to a destination user device associated with a different 911-NOW node (namely, 911-NOW node $110_B$), encapsulates the inner IP packets within respective outer IP packets, thereby forming IP-in-IP packets. The source 911-NOW node $110_D$ transmits the IP-in-IP packets to intermediate 911-NOW node $110_C$, which routes the IP-in-IP packets to destination 911-NOW node $110_B$ (using standard routing on the outer IP packet without having to perform an association table lookup). The destination 911-NOW node $110_B$ (which determines that it is the destination 911-NOW node using information included within the header of the outer IP packet of the IP-in-IP packet) decapsulates the inner IP packet from the outer IP packet. The destination 911-NOW node $110_B$ delivers the inner IP packets to destination user device $704_Z$ (using information included within the headers of the inner IP packets).

Figure 8:
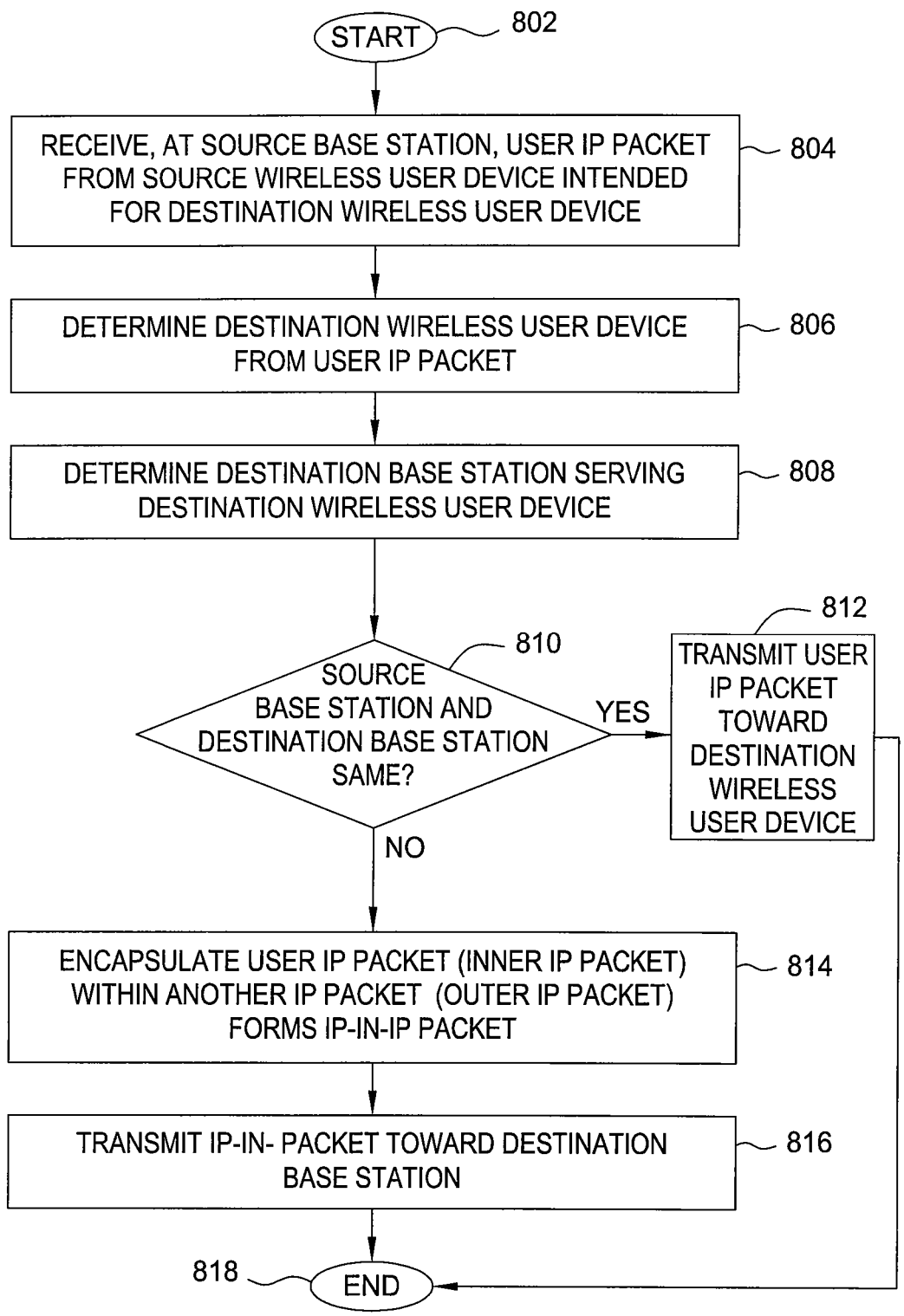
FIG. 8 depicts a method according to one embodiment of the present invention.

FIG. 8 depicts a method according to one embodiment of the present invention. Specifically, method 800 of FIG. 8 includes a method for tunneling IP packets between base stations using an IP-in-IP packet in which an IP packet received from a wireless user device is encapsulated within another IP packet. Although depicted and described as being performed serially, at least a portion of the steps of method 800 of FIG. 8 may be performed contemporaneously, or in a different order than depicted and described with respect to FIG. 8. The method 800 begins at step 802 and proceeds to step 804.

At step 804, an IP packet is received. The IP packet is received at a base station. The IP packet is received from a first wireless user device (denoted as the source wireless user device) associated with the base station (denoted as the source base station since the base station is serving the source wireless user device). The IP packet is intended for delivery to a second wireless user device (denoted as the destination wireless user device). The received IP packet may also be referred to as a user IP packet.

At step 806, the destination wireless user device for which the IP packet is intended is determined. The destination wireless user device is determined from the header of the received user IP packet (e.g., from the destination IP address field in the header of the received user IP packet).

At step 808, the base station serving the destination wireless user device is determined (denoted as the destination base station since the base station is serving the destination wireless user device). In one embodiment, the destination base station serving the destination wireless user device may be determined using an association table maintained at the source base station (e.g., such as an association table as depicted and described herein with respect to FIG. 4-FIG. 6). In this embodiment, the source base station may use an identifier of the determined destination wireless user device in order to search a local association table to determine the base station currently serving the destination wireless user device.

At step 810, a determination is made as to whether the source base station and the destination base station (for that received IP packet) are the same.

If the source base station and destination base station are the same, the source and destination wireless user devices are associated with the same base station and, thus, backhaul of the IP packet between base stations is not required. In this case, method 800 proceeds to step 812, at which point the base station transmits the IP packet toward the destination wireless user device. From step 812, method 800 proceeds to step 818, where method 800 ends.

If the source base station and destination base station are not the same, the source and destination wireless user devices are associated with different base stations and, thus, backhaul of the IP packet between base stations is required. In this case, method 800 proceeds to step 814, at which point the source base station processes the IP packet for transmission to the destination base station.

At step 814, the source base station encapsulates the received IP packet (denoted as an inner IP packet, or embedded IP packet) within another IP packet (denoted as an outer IP packet), thereby forming an IP-in-IP packet. In one embodiment, the source base station encapsulates (or embeds) the inner IP packet within the outer IP packet by including the inner IP packet within the payload of the outer IP packet and setting one or more values in the header of the outer IP packet. In one such embodiment, the source IP address field and destination IP address field values in the header of the outer IP packet are set to identify the source base station and destination base station, respectively (e.g., using base station identifiers, base station IP addresses, or other identifiers).

At step 816, the IP-in-IP packet is transmitted from the source base station toward the destination base station. The IP-in-IP packet is transmitted using a backhaul interface of the base station. The IP-in-IP packet is transmitted toward a next hop in the backhaul path from the source base station to the destination base station (which may be the destination base station (in a single hop situation) or an intermediate base station between the source and destination base stations (in a multi-hop situation)). Although omitted for purposes of clarity, the IP-in-IP packet may be routed from the source base station to the destination base station using any routing protocol. At step 818, method 800 ends.

By encapsulating the inner IP packet within an outer IP packet to form an IP-in-IP packet, details of the source and destination wireless user devices are hidden from any intermediate base stations in the backhaul path from the source base station to the destination base station, thereby enabling use of standard routing protocols for backhaul transport of IP packets. Thus, IP-in-IP packets essentially form an IP-in-IP tunnel between the source base station and destination base station (in that the details of the source and destination wireless user devices are hidden from intermediate base stations in the backhaul path from the source base station to the destination base station). A method by which a base station may process a received IP-in-IP packet is depicted and described herein with respect to FIG. 9.

Figure 9:
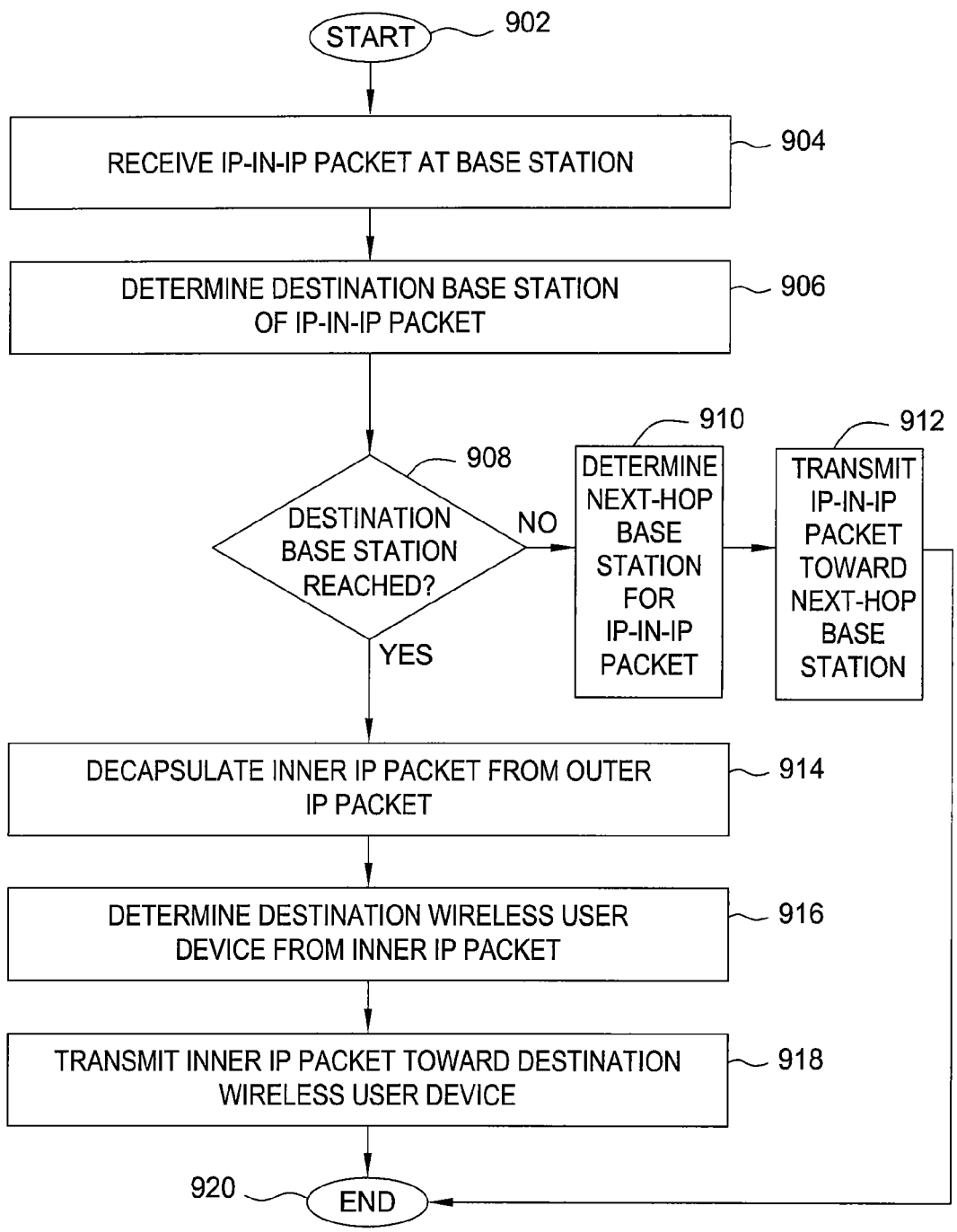
FIG. 9 depicts a method according to one embodiment of the present invention.

FIG. 9 depicts a method according to one embodiment of the present invention. Specifically, method 900 of FIG. 9 includes a method for processing an IP-in-IP packet received at a base station. Although depicted and described as being performed serially, at least a portion of the steps of method 900 of FIG. 9 may be performed contemporaneously, or in a different order than depicted and described with respect to FIG. 9. The method 900 begins at step 902 and proceeds to step 904.

At step 904, an IP-in-IP packet is received at a base station. The base station at which the IP-in-IP packet is received may be the destination base station for which the IP-in-IP packet is intended, or an intermediate base station along a backhaul path between the source base station and destination base station. In other words, handling of a received IP-in-IP packet is dependent upon whether the base station at which the IP-in-IP packet is received is the destination base station for the IP-in-IP packet. In one embodiment, the IP-in-IP packet may be formed and transmitted to the base station by a source base station according to method 800 depicted and described with respect to FIG. 8.

As described herein with respect to FIG. 7 and FIG. 8, an IP-in-IP packet is a packet including an inner IP packet which has been encapsulated within an outer IP packet. The inner IP packet is an IP packet from a source wireless user device that is intended for a destination wireless user device (thus, the source IP address field and destination IP address field in the header of the inner IP packet identify the IP addresses of the source and destination wireless user devices, respectively). The outer IP packet is an IP packet which encapsulates the inner IP packet. The outer IP packet identifies the source and destination base stations in the source and destination IP address fields, respectively (e.g., using base station identifiers, base station IP addresses, or other means for identifying base stations).

At step 906, the base station determines the destination base station of the IP-in-IP packet (i.e., the base station to which the IP-in-IP packet is intended to be delivered). The destination base station of the IP-in-IP packet is determined from the header of the IP-in-IP packet (i.e., the header of the outer IP packet which encapsulates the inner IP packet). The destination base station of the IP-in-IP packet is determined from the destination IP address field of the header of the IP-in-IP packet (or using values from one or more other fields of the IP-in-IP packet).

At step 908, a determination is made as to whether the destination base station has been reached. In one embodiment, the determination as to whether the destination base station has been reached is performed by determining whether the base station at which the IP-in-IP packet has been received is the same as the base station identified in the IP-in-IP packet as the destination base station. If the base station at which the IP-in-IP packet is received is not the destination base station, the destination base station has not been reached and method 900 proceeds to step 910 (for routing the IP-in-IP packet toward the destination base station). If the base station at which the IP-in-IP packet is received is the destination base station, the destination base station has been reached and method 900 proceeds to step 914 (for delivering the inner IP packet to the destination wireless user device).

At step 910, the base station determines the next-hop base station along the backhaul path towards the destination base station (which may be the destination base station or an intermediate base station along the backhaul path to the destination base station). The next-hop base station may be determined using any routing protocol. For example, the base station may access a local routing table (e.g., using an identifier of the destination base station determined from the IP-in-IP packet at step 906) to determine the next-hop base station. At step 912, the base station transmits the IP-in-IP packet toward the next-hop base station. The base station transmits the IP-in-IP packet toward the next-hop base station using a backhaul interface (which may be a wireline interface, a wireless mesh interface, a wireless backhaul interface, and the like). From step 912, method 900 proceeds to step 920, where method 900 ends.

By encapsulating the inner IP packet within the outer IP packet to form the IP-in-IP packet, any intermediate base stations in the backhaul path are prevented from having to perform look-ups based on the destination wireless user device in order to determine the destination base station serving that destination wireless user device (i.e., the outer IP packet hides the details of the inner IP packet from intermediate base stations along the backhaul path). Rather, intermediate base stations in the backhaul path merely have to examine the header of the outer IP packet in order to determine the destination base station, thereby reducing the time and resources required to route IP packets between wireless user devices. Thus, use of IP-in-IP packets essentially enables IP packets of wireless user devices to be tunneled between source and destination base stations.

At step 914, the base station decapsulates the inner IP packet from the outer IP packet. In one embodiment, the base station extracts the inner IP packet from the payload of the outer IP packet (e.g., by stripping off the header of the outer IP packet). At step 916, the base station determines the destination wireless user device. The base station determines the destination wireless user device from the header of the inner IP packet (e.g., from the destination IP address field of the header of the inner IP packet). At step 918, the base station transmits the inner IP packet (generated by the source wireless user device) toward the destination wireless user device. The base station transmits the inner IP packet toward the destination wireless user device using a wireless access interface.

At step 920, method 900 ends. Although primarily depicted and described herein with respect to base stations supporting wireless access capabilities and wireless mesh/backhaul capabilities, in other embodiments, at least a portion of the base stations of the network may be designed as wireless access points (i.e., only supporting wireless access for wireless user devices) or wireless relay points (i.e., only supporting wireless backhaul between base stations). In such embodiments, depending on the role assigned to a particular base station, the base station may only use a portion of the functions depicted and described herein with respect to method 900 of FIG. 9 (e.g., in such embodiments, at least step 908 may be eliminated since the determination as to whether to forward the inner IP packet over a wireless access interface or forward the IP-in-IP packet over a wireless backhaul interface is predetermined by the role assigned to that base station).

Although primarily depicted and described with respect to wireless backhaul connections between base stations of a backhaul path, backhaul of packets between base stations according to the present invention may also be performed using wireline backhaul connections, or a combination of wireline and wireless backhaul connections, between base stations of a backhaul path.

Although primarily depicted and described herein with respect to tunneling IP packets between base stations, packets formatted according to various other protocols may be tunneled between base stations.

Although primarily depicted and described herein with respect to encapsulating a received IP packet within another IP packet to form an IP-in-IP packet, tunneling of packets between base stations may be provided using various other implementations enabling the packets to be routed between base stations without processing addresses of source or destination wireless user devices (e.g., without having to perform association table lookups in order to route packets via wireless paths).

In one embodiment, a received IP packet may be encapsulated within another type of packet associated with another type of protocol (i.e., rather than being encapsulated within an IP packet). In another embodiment, encapsulation of the received IP packet may be performed by adding one or more values to the received IP packet (e.g., pre-pending a value identifying the destination base station). The received IP packets may be encapsulated in various other ways. In one embodiment, one or more tunneling protocols may be used for tunneling packets between base stations, such as Generic Routing Encapsulation (GRE), Point-to-Point Tunneling Protocol (PPTP), GPRS Tunneling Protocol (GTP), and the like.

Therefore, since many different protocols may be used for user packets and many different protocols and/or tunneling technologies may be used for encapsulating/tunneling user packets: (1) inner IP packets (also referred to herein as received IP packets) may be more generally referred to herein as user packets, (2) outer IP packets may be more generally referred to herein as encapsulating packets, and (3) IP-in-IP packets may be more generally referred to herein as encapsulated user packets or tunneled user packets.

Furthermore, although the packet tunneling functions of the present invention are primarily depicted and described within the context of embodiments in which mobility management is provided using association tables maintained at the base stations, packet tunneling functions of the present invention be used for packet routing in wireless networks employing various other mobility management schemes. For example, packet tunneling functions of the present invention may be used in conjunction with MobileIP or other mobility management techniques.

Figure 10:
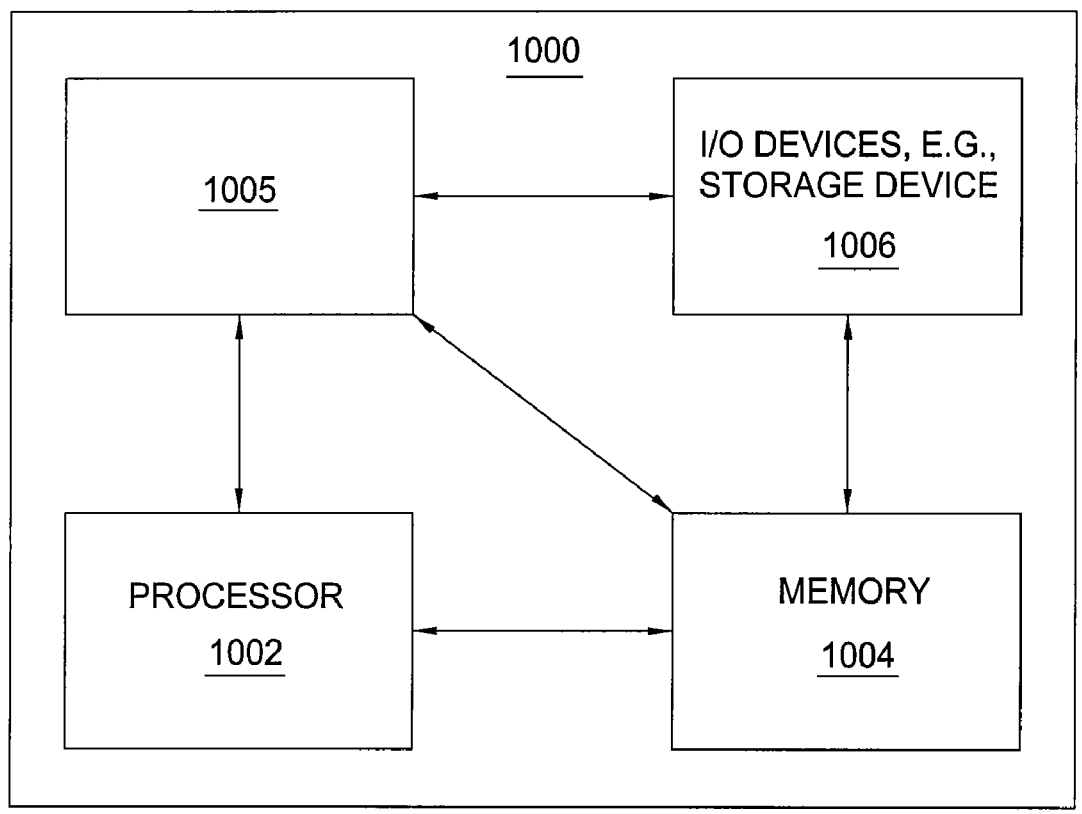
FIG. 10 depicts a high-level block diagram of a general-purpose computer suitable for use in performing the functions described herein.

FIG. 10 depicts a high-level block diagram of a general-purpose computer suitable for use in performing the functions described herein. As depicted in FIG. 10, system 1000 comprises a processor element 1002 (e.g., a CPU), a memory 1004, e.g., random access memory (RAM) and/or read only memory (ROM), a routing module 1005, and various input/output devices 1006 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present routing process 1005 can be loaded into memory 1004 and executed by processor 1002 to implement the functions as discussed above. As such, routing process 1005 (including associated data structures) of the present invention can be stored on a computer readable medium or carrier, e.g., RAM memory, magnetic or optical drive or diskette, and the like.

Although primarily depicted and described herein with respect to using rapidly deployable nodes (such as 911-NOW nodes depicted and described herein) to deploy a wireless network in emergency response situations, rapidly deployable nodes may be used to deploy a wireless network in various other situations. In one embodiment, rapidly deployable nodes may be used in large-crowd environments. For example, rapidly deployable nodes may be deployed during large-crowd events, such as sporting events (e.g., in a city hosting the Super Bowl, in a city hosting the Olympics, and the like), concerts, and the like. In one embodiment, rapidly deployable nodes may be used as a rapid replacement network for commercial cellular networks (i.e., to replace existing network infrastructure while such infrastructure is unavailable). In one embodiment, rapidly deployable nodes may be used in military environments (e.g., to form a rapidly deployable network on the battlefield or in other situations).

Therefore, rapidly deployable nodes according to the present invention are useful for various other applications in addition to emergency response applications, and, thus, may be deployed in various other situations in addition to emergency situations. Thus, the term "emergency site", which is used herein to denote the geographical location in which one or more rapidly deployable nodes may be deployed to form a wireless network, may be more commonly referred to as a "network site" (i.e., the site at which the rapidly deployable wireless network is deployed to support wireless communications). Similarly, other terms primarily associated with emergency applications may be referred to more generally depending upon the application in which rapidly deployable nodes are deployed. In other words, any number of rapidly deployable nodes according to the present invention may be deployed to any geographical location to form a wireless network for any reason.

Furthermore, although primarily depicted and described herein with respect to providing IP mobility management and/or IP packet routing for a specific type of wireless node (e.g., 911-NOW nodes), present invention may be used to provide IP mobility management and/or IP packet routing for various other types of wireless nodes. Moreover, although primarily depicted and described herein with respect to rapidly deployable wireless networks, the present invention may be used to provide IP mobility management and/or IP packet routing in any type of wireless network (e.g., other mobile wireless networks, fixed wireless networks, and the like, as well as various combinations thereof). Thus, the present invention is not intended to be limited by the type of wireless transmission equipment, the type of wireless network, and the like depicted and described herein.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for routing a packet in an ad hoc wireless network comprising a plurality of base stations and supporting a plurality of wireless devices, comprising:
   receiving a user packet at a first base station of the plurality of base stations, wherein the user packet is received from a first wireless device associated with the first base station, wherein the user packet is intended for a second wireless device associated with a second base station of the plurality of base stations, wherein the user packet includes an identifier of the second wireless device;
   wherein the first base station comprises a plurality of wireless interfaces including a wireless mesh interface configured to support wireless mesh communications between the first base station and at least one other base station of the plurality of base stations and a wireless backhaul interface configured to support wireless backhaul communications between the first base station and a wireless backhaul network;
   wherein the first base station comprises an association table including, for each of the plurality of wireless devices of the ad hoc wireless network, an indication of the base station with which the wireless device is currently associated;
   identifying the second base station at the first base station using the identifier of the second wireless device and the association table;
   encapsulating the received user packet to form an encapsulated user packet, wherein the user packet is encapsulated using a header comprising an identifier of the second base station; and
   propagating the encapsulated user packet from the first base station toward the second base station via the wireless mesh interface of the first base station.

2. The method of claim 1, wherein the plurality of wireless interfaces includes a wireless access interface configured to support wireless communications with the wireless devices, wherein the user packet is received at the first base station via the wireless access interface.

3. The method of claim 1, wherein the user packet includes a header having a source address field including an identifier of the first wireless device and a destination address field including an identifier of the second wireless device.

4. The method of claim 1, wherein encapsulating the received user packet comprises:
   inserting the received user packet as a payload of the encapsulated user packet.

5. The method of claim 1, wherein encapsulating the received user packet comprises:
   setting a destination field of a header of the encapsulated user packet to include the identifier of the second base station.

6. The method of claim 1, wherein identifying the second base station using the association table comprises:
   searching the association table for an entry associated with the identifier of the second wireless device.

7. An apparatus for routing a packet in an ad hoc wireless network comprising a plurality of base stations and supporting a plurality of wireless devices, the apparatus comprising:

a plurality of wireless interfaces for a first base station of the plurality of base stations, the wireless interfaces comprising a wireless mesh interface configured to support wireless mesh communications between the first base station and at least one other base station of the plurality of base stations and a wireless backhaul interface configured to support wireless backhaul communications between the first base station and a wireless backhaul network;

a memory configured to store an association table including, for each of the plurality of wireless devices of the ad hoc wireless network, an indication of the base station with which the wireless device is currently associated;

a processor communicatively coupled to the wireless interfaces and the memory, the processor configured to:
   receive a user packet at the first base station, wherein the user packet is received from a first wireless device associated with the first base station, wherein the user packet is intended for a second wireless device associated with a second base station of the plurality of base stations, wherein the user packet includes an identifier of the second wireless device;
   identify the second base station at the first base station using the identifier of the second wireless device and the association table;
   encapsulate the received user packet to form an encapsulated user packet, wherein the user packet is encapsulated using a header comprising an identifier of the second base station; and
   propagate the encapsulated user packet from the first base station toward the second base station via the wireless mesh interface of the first base station.

8. The apparatus of claim 7, wherein the plurality of wireless interfaces includes a wireless access interface configured to support wireless communications with the wireless devices, wherein the user packet is received at the first base station via the wireless access interface.

9. The apparatus of claim 7, wherein the user packet includes a header having a source address field including an identifier of the first wireless device and a destination address field including an identifier of the second wireless device.

10. The apparatus of claim 7, wherein, to encapsulate the received user packet, the processor is configured to:
   insert the received user packet as a payload of the encapsulated user packet.

11. The apparatus of claim 7, wherein, to encapsulate the received user packet, the processor is configured to:
   set a destination field of a header of the encapsulated user packet to include the identifier of the second base station.

12. The apparatus of claim 7, wherein, to identify the second base station using the association table, the processor is configured to:
   searching the association table for an entry associated with the identifier of the second wireless device.

13. The apparatus of claim 7, further comprising:
   a Radio Access Network (RAN) module configured to support, for the wireless devices of the ad hoc wireless network, one or more functions of a RAN network controller.

14. The apparatus of claim 13, wherein the RAN functions module is a Base Station Router (BSR).

15. The apparatus of claim 13, wherein the RAN functions module is configured to support at least one of admission control, power control, packet scheduling, load control, handover control, and security functions.

16. The apparatus of claim 7, further comprising:
   a core networking module configured to support, for the wireless devices of the ad hoc wireless network, one or more functions of a core wireless network.

17. The apparatus of claim 16, wherein the core networking functions module is configured to support at least one of:
   an authentication, authorization, and accounting (AAA) function;
   a Domain Name System (DNS) function; and
   a Dynamic Host Configuration Protocol (DHCP) function.

* * * * *